Dec. 19, 1967 W. J. HANNAN 3,359,375

SWITCHING SYSTEM

Filed Dec. 26, 1963 2 Sheets-Sheet 1

INVENTOR.
WILLIAM J. HANNAN
BY Edward J. Norton
ATTORNEY

Dec. 19, 1967 W. J. HANNAN 3,359,375

SWITCHING SYSTEM

Filed Dec. 26, 1963 2 Sheets-Sheet 2

INVENTOR.
WILLIAM J. HANNAN
BY Edward J. Norton
ATTORNEY

United States Patent Office 3,359,375
Patented Dec. 19, 1967

3,359,375
SWITCHING SYSTEM

William James Hannan, Moorestown, N.J., assignor to Radio Corporation of America, a corporation of Delaware Filed Dec. 26, 1963, Ser. No. 333,376
1 Claim. (Cl. 179—100.2)

ABSTRACT OF THE DISCLOSURE

A sequential switching circuit is disclosed which uses a pair of diode bridge circuits. First and second signals are individually applied to the respective bridge circuits so that at least a portion of the first signal overlaps in time a portion of the second signal. An output is connected in common to the two bridge circuits. The bridge circuits are operated to fadeout one of the received signals which appears at the output while fading in the other signal at the output in a continuous and complementary manner. The first and second signals are made to form a continuous, equal amplitude, signal at the common output.

Figure 1:
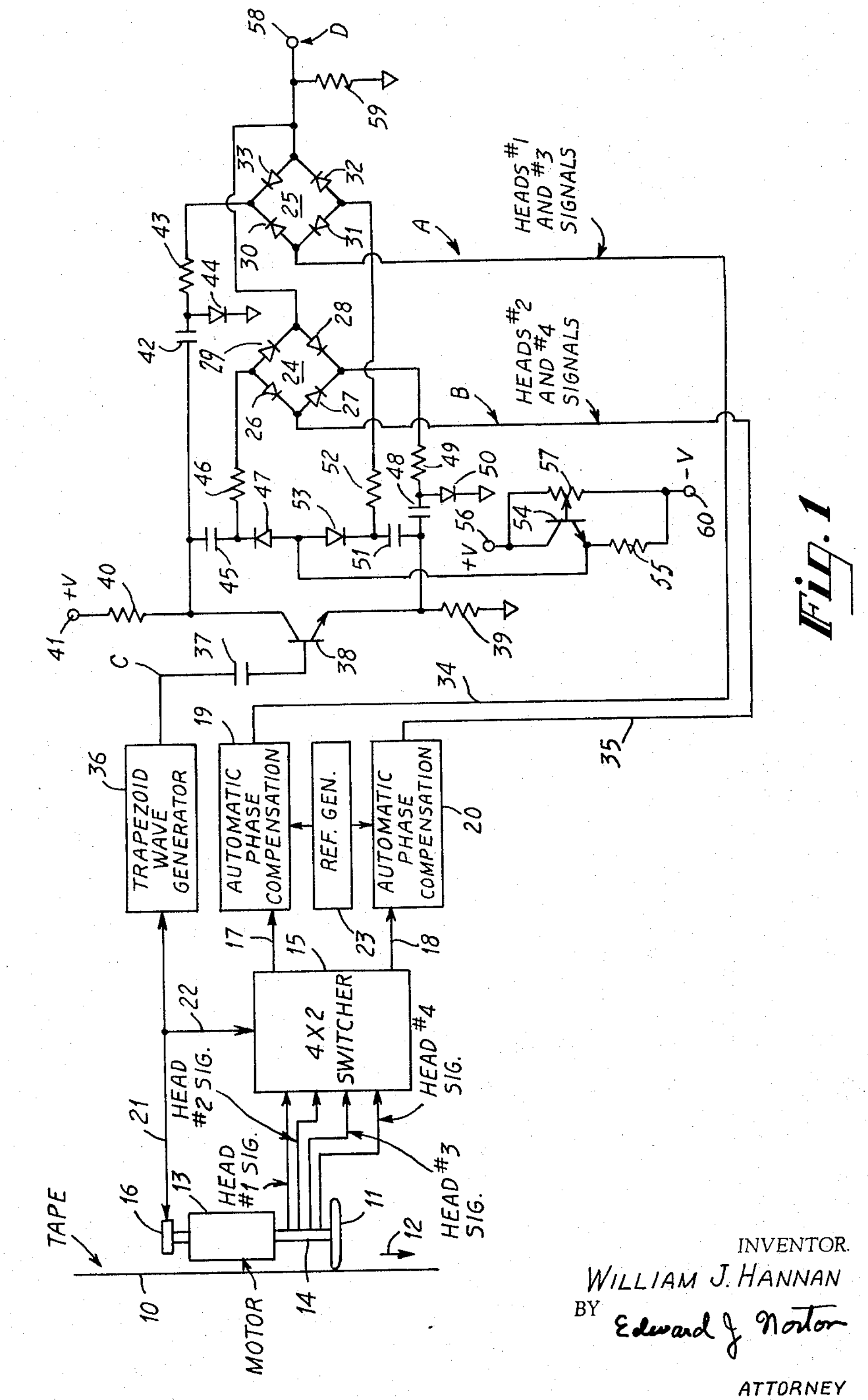

This invention relates to switching systems, and, particularly, to an improved sequential switching system for producing a continuous signal from time segments of that signal.

A multi-head, transverse scan, magnetic tape recorder is one example of a system in which a signal is divided into time segments and then reformed by combining the segments into a continuous signal. A plurality of magnetic heads are contained in an assembly arranged to rotate at an angle with respect to the direction in which the magnetic tape is driven. Each head, in turn, scans the tape in a direction transverse to the tape motion so that the head is in a recording relation with the tape during a portion of its rotation. By simultaneously feeding the signal to be recorded as a frequency modulated signal to all of the heads, the signal is recorded on successive, transverse tracks with each track being placed on the tape by a single head. A detailed discussion of one form which a signal recorder of this type can take is found, for example, in a book entitled "Video Tape Recording" by Julian Bernstein, 1960, published by J. F. Rider Publisher Inc., New York. Signal recorders using other recording means, for example, magnetic heads positioned in a stationary mount or cathode ray switching tubes, are also known which depend for their operation on the dividing of a signal into recorded time segments of the signal.

In reproducing a signal from a record medium upon which a signal has been recorded using any one of the above techniques, the outputs from the magnetic heads or other pick-up devices are available in a sequential manner. This is true since first one pick-up device will reproduce the portion of the signal recorded on one track, a second pick-up device will reproduce the following portion of the signal recorded on a second track, and so on. Some form of sequential switching between the outputs of the pick-up devices is needed to produce a continuous output corresponding to the original signal recorded on the record medium.

In order to provide for such factors as bandwidth and frequency response, signal recorders of the type under discussion typically involve the recording of the signal in some form of frequency modulation. Where frequency modulation recording is used in a system which includes sequential switching between the outputs of the pick-up devices, random phase relationships introduced at the time of switching results in the presence of transients in the reproduced signal after demodulation. If the reproduced signal is formed by abruptly switching between the time segments of the signal appearing at the outputs of the pickup devices, the resulting switching transients can be large, preventing the proper operation of the equipment to which the reproduced signal is fed.

In recording and reproducing a television or other synchronous signal, the switching can be timed so that the transients occur in the sync intervals in the case of a television signal or in the control period in the case of some other form of synchronous signal. The usual sync removal and reinsertion procedures serve to remove the transients from the reproduced signal. In this case the presence of the transients has little adverse effect on the message content of the reproduced signal.

Where the signal recorder is intended to be used to record and reproduce a non-synchronous signal which exhibits a continuous and unbroken message content, no convenient sync or control interval exists. The presence in a reproduced signal of large transients resulting from an abrupt switching between the time segments of the signal seriously distorts and otherwise renders the reproduced signal difficult to process.

It is an object of the invention, therefore, to provide an improved switching system for producing a single, continuous signal from time segments of that signal.

Another object is to provide an improved signal recorder-playback system of the type in which sequential switching is used to recover the recorded signal.

A further object is to provide an improved playback system for reconstructing a continuous, frequency modulated signal from separate frequency modulated time segments of that signal recorded individually on separate tracks of a record medium.

A still further object is to provide in a multi-head magnetic recorder, which records a received frequency modulated, non-synchronous signal on successive tracks extending transversely on a magnetic record medium, an improved sequential switching system for producing the signal from the portions of the signal recorded on the tracks.

Briefly, in one embodiment it is assumed that a quadruplex, magnetic tape signal recorder and reproducer is provided which, in reproducing a recorded, frequency modulated signal, produces a first series of spaced frequency modulated signal intervals of constant amplitude corresponding to the signals reproduced by two of the four magnetic heads included in a rotating head wheel assembly. A second series of spaced frequency modulated signal intervals of a constant amplitude equal to that of the signal intervals in the first series and corresponding to the signals reproduced by the remaining two magnetic heads is also produced. The signal intervals in the second series are timed so that each signal interval in the second series exists during the time period between successive signal intervals in the first series and overlaps the signal intervals in the first series. A signal interval in the second series begins before a signal interval in the first series ends, the signal interval in the second series ending after the next signal interval in the first series begins. During the period of overlap, the message content at the end of the signal interval in one series is the same as that at the beginning of the signal interval in the other series.

The first and second series of signal intervals are fed to a switching system including a pair of diode quads, exemplified in this instance by two sets of four diodes, each set of four called a quad. A control signal is applied to the diode quads in a manner to cause one of the diode quads to pass the signal intervals in the first series to an output terminal and to cause the second diode quad to pass the signal intervals in the second series to the same output terminal. The diode quads are operated so that, during the period of overlap between a signal interval in one series and a signal interval in the other series, the amplitude of the signal interval ending during the period of overlap and appearing at the output terminal is reduced at a given rate from a given level to zero. At the same time, the amplitude of the signal interval beginning during the same period of overlap and appearing at the output terminal is increased at the given rate from zero to the given level. The diode quads are operated to provide simultaneously and synchronously the fade-out of one signal interval and the fade-in of the following signal interval.

The first and second series of signal intervals are combined to form a frequency modulated, continuous signal of constant amplitude at the output terminal. By providing a controlled and gradual switching of the signal intervals in and out to form the continuous signal, with the switching occurring during the period of overlap between the signal intervals, transients produced in the continuous signal after demodulation due to the introduction of random phase relationships in the continuous signal at the time of switching are reduced or minimized.

Figure 2:
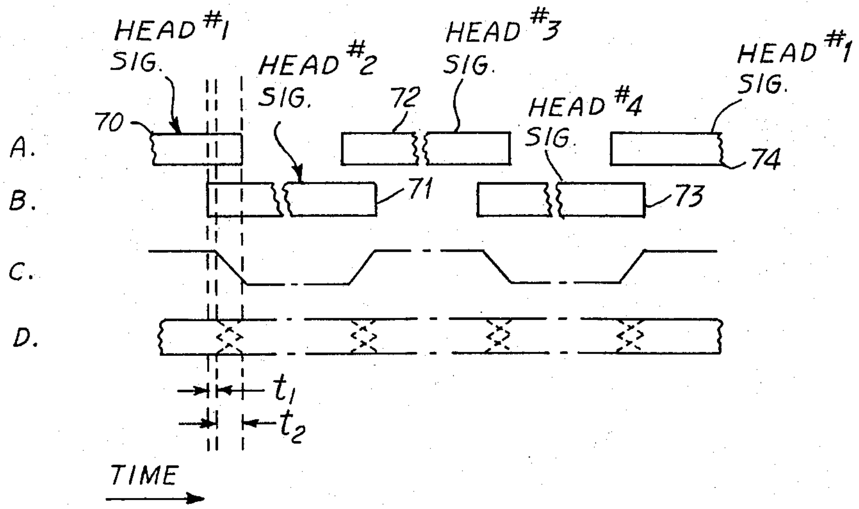

A more detailed description of the invention will now be given in connection with the accompanying drawing, in which:

FIG. 1 is partly a block diagram and partly a circuit diagram of one embodiment of a switching system constructed according to the invention; and FIG. 2 is a series of waveforms and timing diagrams useful in describing a typical operation of the embodiment shown in FIG. 1.

Ground symbols and common return paths are omitted from the blocks shown in FIG. 1 in order to simplify the drawing. Such connections can be supplied in a known manner.

In describing an embodiment of the invention, reference will be made to the use of the invention in a quadruplex, non-synchronous signal recording and reproducing equipment. The invention is not limited to use in such an application but can be used wherever it is desired to form a continuous signal from a plurality of signal intervals supplied in some sort of time sequence. It is not necessary to the construction or operation of the invention that the signal intervals be supplied from the pick-up devices of a signal recorder-reproducer. The invention can be used in applications involving either non-synchronous or synchronous signals.

In the operation of a quadruplex magnetic tape signal recorder or reproducer, a head wheel is provided having four magnetic heads spaced ninety degrees apart about the periphery thereof. The head wheel is rotated in a plane perpendicular to the direction of a magnetic tape driven past the head wheel. As the tape passes the head wheel, it is formed into an arcuate contour having somewhat more than a ninety degree angle. Each head, in turn, scans the tape in a direction transverse to the tape motion so that the head is in a recording relation with the tape during somewhat more than ninety degrees of its rotation. In recording a signal, the signal is fed simultaneously to all four heads which operate to record the signal on successive transverse tracks along the tape. Since the heads are spaced ninety degrees apart with each head completing an angle of rotation somewhat greater than ninety degrees while in a recording relation with the tape, each head begins its scan across the tape before the previous head completes its scan and leaves the tape. As a result some overlap of the signal as recorded on the tape takes place. The same portion of the signal recorded at the end of one transverse track is also recorded at the beginning of the next track.

A magnetic tape 10 is shown in FIG. 1. The tape 10 is assumed to be one upon which a signal has been recorded following the techniques outlined above. The signal is assumed to be a non-synchronous, frequency modulated data signal as might be originally produced by radar, telemetry or other data processing equipment. A quadruplex head wheel assembly for reproducing the recorded signal is also shown in simplified form as including a head wheel 11. The head wheel assembly can be the same as that used to record the signal or can be a different assembly. Four magnetic heads, not shown, are equally spaced about the periphery of the wheel 11. The tape 10 is made to assume an arcuate contour conforming to an edge section of the wheel 11 as it is driven in the direction of the arrow 12 past the head wheel 11 by suitable tape guiding and driving means, not shown. The wheel 11 is rotated by a motor 13 through a shaft 14 so that the heads scan in sequence across the record tracks on the tape 10. A frequency modulated signal interval appears at the output of a first one of the heads followed in turn by the appearance of frequency modulated signal intervals at the outputs of the remaining three heads. This cycle is repeated as the wheel 11 completes successive cycles of rotation.

The signal intervals reproduced from the tape 10 are fed over individual leads from the respective heads to a 4×2 switcher 15 by means of slip rings, not shown, mounted on the shaft 14. A more detailed discussion of the operation of a quadruplex signal recorder and reproducer in recording and reproducing a signal can be found in the above cited book by Julian Bernstein.

In order to properly synchronize the reproduction of the recorded signal from the tape 10, a tone wheel pulse generator 16 is typically used. The generator 16 can, for example, include a disc or similar structure constructed of a magnetically susceptible material and rotated by the shaft 14 along with the head wheel 11. An aperture or notch is cut in the edge of the disc so that a pulse is produced each time the surface interruption represented by the aperture or notch passes a suitable magnetic pick-up device. A tone wheel pulse is produced at least once each complete revolution of the head wheel 11. Since the time at which the tone wheel pulse is produced in each revolution of the head wheel 11 is always the same, the tone wheel pulses provide information as to when one head is leaving the tape 10 and the next head is beginning its scan. The tone wheel pulses are fed from the generator 16 to the 4×2 switcher 15 via connections represented by leads 21, 22.

Assuming that the four heads on the wheel 11 are numbered 1, 2, 3, and 4 in the order in which they are positioned about the periphery of the wheel 11, the 4×2 switcher 15 operates in response to the timing information supplied by the tone wheel pulses to cause the signal intervals received from the heads No. 1 and No. 3 to appear on a first output lead 17. The signal intervals received from the heads No. 2 and No. 4 appear on a second output lead 18. The 4×2 switcher 15 can be of an operation and construction similar to that of the 4×2 switcher described in the above cited book by Julian Bernstein. The series of signal intervals appearing on the lead 17 are fed from the 4×2 switcher 15 to a first automatic phase compensation circuit 19, and the series of signal intervals appearing on the lead 18 are fed to a second automatic phase compensation circuit 20. Because of mechanical misalignment of the heads on the wheel 11 and other factors, a random phase relationship exists between the signal intervals appearing at the output of the 4×2 switcher 15 over leads 17, 18. The automatic phase compensation circuits 19 and 20 operate to reduce this random phase relationship. While various techniques can be used to perform this function, one which is commonly employed involves the adding of a pilot tone or similar control signal to the data signal recorded on the tape 10 so that the presence of the pilot tone in no way distorts or otherwise affects the message content of the recorded data signal.

The pilot tone is recorded on the tape 10 along with the data signal and is subject to the same influences and variables as the data signal. Each reproduced signal interval appearing at the output of the 4×2 switcher 15, therefore, includes a pilot tone having a phase corresponding to that of the portion of the data signal included in the signal interval. The automatic phase compensation circuits 19, 20 include suitable circuitry for removing the pilot tone from the received signal intervals and for comparing the phase of the recovered pilot tones with that of a reference signal supplied by a reference generator 23. The resulting error signals are then used to control a variable delay line or other structure arranged to adjust the phase of the received signal intervals.

Ideally, the automatic phase compensation circuits 19, 20 operate to produce a zero phase difference between the signal intervals received over leads 17, 18. With such a signal condition, it is possible to produce a practical, continuous signal by simply and abruptly switching between the signal intervals. Since no phase change takes place at the time of switching, no random phase relationships due to switching are introduced in the continuous signal. As a practical matter, such a degree of phase control generally is not achieved. The phase differences between the signal intervals are held to less than 180 degrees, typically, to approximately 30 degrees. Since the message content is carried in the frequency or phase of the continuous signal, any random phase relationship introduced in the signal is detected upon the demodulation of the signal. Any effort to form the continuous signal by switching abruptly between signal intervals having such a phase difference results in the introduction of large and objectionable transients in the resulting continuous signal when demodulated.

In accordance with the embodiment of the invention shown in FIG. 1, there is provided a first diode quad 24 and a second diode quad 25. The first diode quad 24 includes four unidirectional current conducting devices shown as crystal diodes 26, 27, 28, 29 arranged to form a bridge switch circuit. Similarly, the second diode quad 25 includes four unidirectional current conducting devices shown as crystal diodes 30, 31, 32, 33 arranged to form a bridge switch circuit. In the case of the crystal diodes 26 through 33 and the other crystal diodes in FIG. 1 to be described, the arrow indicates the direction of easy current flow through the diodes i.e., the arrow head is the anode. The signal intervals reproduced by heads No. 1 and No. 3 on the wheel 11, which appear at the output of the first automatic phase compensation circuit 19, are fed over a lead 34 to the anode electrode of the diode 30 included in the second diode quad 25 and to the cathode electrode of the diode 31 also included in the second diode quad 25. The signal intervals reproduced by the heads No. 2 and No. 4 on the wheel 11 are fed via lead 35 from the output of the second automatic phase compensation circuit 20 to the cathode electrode of the diode 26 included in the first diode quad 24 and to the anode electrode of the diode 27 also included in the first diode quad 24. The signal intervals produced at the outputs of the automatic phase compensation circuits 19, 20 are of the same, constant amplitude.

The tone wheel pulses provided by the generator 16 are fed over lead 21 to a trapezoid wave generator 36. As pointed out above, the tone wheel pulses include include information as to when one head on the wheel 11 is completing its scan across the tape 10 and the next head is beginning its scan. The generator 36 operates in response to the tone wheel pulses to produce a trapezoid wave in which the leading and trailing edges of each trapezoidal pulse occur during periods in which successive ones of the reproduced signal intervals overlap. Considering a single pulse in the trapezoid wave, the leading edge occurs during the period extending in time from the point at which a given signal intervals begins to the later point at which the previous signal interval ends, i.e. during the signal overlap. The trailing edge of the pulse occurs during the time period between the point at which the next signal interval begins and the point at which the given signal interval ends i.e., the next signal overlap.

The trapezoid wave is coupled by a capacitor 37 from the generator 36 to the base electrode of an NPN junction transistor 38. The emitter electrode of the transistor 38 is connected through a resistor 39 to a point of reference potential such as ground, and the collector electrode of the transistor 38 is connected through a resistor 40 to the positive terminal 41 of a source of unidirectional potential. The collector electrode of the transistor 38 is coupled to the cathode electrodes of the diodes 30, 33 both of which are included in the second diode quad 25 over an electrical path including a capacitor 42 and a resistor 43. The anode electrode of a unidirectional current conducting device shown as crystal diode 44 is connected to the junction of the capacitor 42 and the resistor 43, the cathode electrode of the diode 44 being connected to the point of reference potential or ground. The collector electrode of the transistor 38 is also coupled to the anode electrodes of the diodes 26, 29 included in the first diode quad 24 over an electrical path including a capacitor 45 and a resistor 46. The cathode electrode of a unidirectional current conducting device shown as crystal diode 47 is connected to the junction of the capacitor 45 and the resistor 46.

The emitter electrode of the transistor 38 is coupled to the cathode electrodes of the diodes 27, 28 included in the first diode quad 24 over an electrical path including a capacitor 48 and a resistor 49. The anode electrode of a unidirectional current conducting device shown as crystal diode 50 is connected to the junction of the capacitor 48 and the resistor 49, a connection being completed from the cathode electrode of the diode 50 to ground. The emitter electrode of the transistor 38 is also coupled to the anode electrodes of the diodes 31, 32 included in the second diode quad 25 over an electrical path including a capacitor 51 and a resistor 52. The cathode electrode of a unidirectional current conducting device shown as crystal diode 53 is connected to the junction of the capacitor 51 and the resistor 52.

The anode electrodes of the diodes 47, 53 are connected together and to the emitter electrode of an NPN junction transistor 54. A resistor 55 is connected between the emitter electrode of the transistor 54 and the negative terminal 60 of a source of unidirectional potential, for example, −10 v. The collector electrode of the transistor 54 is connected to the positive terminal 56 of a source of unidirectional potential, for example, +20 v. The base electrode of the transistor 54 is connected to the wiper arm of a variable resistor 57. The resistor 57 is connected at one end to the positive terminal 56 and at the other end to the negative terminal 60.

Transistor 54 operates as a variable, low impedance source of bias potential for the two diode quads 24 and 25. The level and polarity of the bias potential is determined by the setting of the resistor 57. Assuming for the moment that the transistor 54 is operated to supply a positive bias to the anode electrodes of the diodes 53 and 47, the anode electrodes of the diodes 31 and 32 in the second diode quad 25 are clamped to the positive bias potential by the diode 53. The anode electrodes of the diodes 26 and 29 in the first diode quad 24 are clamped to the positive bias potential by the action of the diode 47. The cathode electrodes of the diodes 27 and 28 in the first diode quad 24 are clamped to ground by the diode 50, and the cathode electrodes of the diodes 30 and 33 in the second diode quad 25 are clamped to ground by the diode 44.

In the assumed condition of operation, therefore, transistor 54 operates to supply a forward bias to both of the diode quads 24, 25. As will be described below, the level of the forward bias is determined according to the characteristics of the diodes 26 through 33 included in the two diode quads 24, 25 so that the forward bias is less than that required to place the two diode quads 24, 25 in a condition of current conduction while, at the same time, providing the desired operation of the two diode quads 24, 25.

The cathode electrode of the diode 29 included in the first diode quad 24 and the anode electrode of the diode 28 also included in the first diode quad 24 are connected together and to an output terminal 58. The anode electrode of the diode 33 included in the second diode quad 25 and the cathode electrode of the diode 32 also included in the second diode quad 25 are connected together and to the same output terminal 58. An output load resistor 59 is connected between the terminal 58 and the point of reference potential.

A typical operation of the embodiment shown in FIG. 1 will now be described with the aid of the waveforms and timing diagrams shown in FIG. 2. The first line A of FIG. 2 indicates the intervals during which signals are reproduced by the heads No. 1 and No. 3 and appear on lead 34 at the output of the first automatic phase compensation circuit 19. The next line B indicates the intervals during which signals are reproduced by the heads No. 2 and No. 4 and appear on lead 35 at the output of the second automatic phase compensation circuit 20. As indicated by the broken line sections, only that portion of the signal intervals necessary to the description is shown in the timing diagrams A and B. Waveform C represents the trapezoid wave produced by the generator 36, and waveform D represents the resulting continuous, frequency modulated signal produced at the output terminal 58.

It will be assumed that the operation starts at a time when a frequency modulated signal occurring during interval 70 shown in line A of FIG. 2 is present on lead 34 at the output of the first automatic phase compensation circuit 19. The signal occurring during the interval 70, which is indicated as having been reproduced by the head No. 1 on the wheel 11, is applied to the cathode electrode of the diode 31 included in the second diode quad 25 and to the anode electrode of the diode 30 also included in the second diode quad 25. As indicated in waveform C of FIG. 2, the trapezoid wave coupled to the base electrode of the transistor 38 is positive-going at this time. Transistor 38 is biased for Class A operation, and is always conducting. The reception of the trapezoid wave at its positive-going level causes the transistor 38 to conduct more heavily. The transistor 38 operates as a phase splitter, producing a trapezoid wave at its collector electrode which is 180 degrees out of phase with a corresponding trapezoid wave produced at its emitter electrode. Upon the transistor 38 conducting more heavily in response to the positive-going trapezoid wave received from the generator 36, the trapezoid wave at the collector electrode of the transistor 38 becomes negative-going. The trapezoid wave at the emitter electrode of the transistor 38 becomes positive-going.

The clamping action of the diode 47 causes the capacitor 45 to be charged in a negative direction to the level of the bias potential supplied by the transistor 54, clamping the anode electrodes of the diodes 26, 29 in the first diode quad 24 to that bias potential. The clamping action of the diode 50 causes the capacitor 48 to be charged in a positive direction to ground potential, clamping the cathode electrodes of the diodes 27, 28 in the first diode quad 24 to ground. As noted above, the resulting forward bias applied to the diode quad 24 is less than that required to cause the diodes 26, 27, 28, 29 in the first diode quad 24 to conduct. The first diode quad 24 is held non-conducting, preventing the passage therethrough of any signal received from the second phase compensation circuit 20 over lead 35.

The capacitor 42 is charged in a negative direction, driving the clamping diode 44 into non-conduction and supplying a more negative voltage to the cathode electrodes of the diodes 30, 33 included in the second diode quad 25. The capacitor 51 is at the same time charged in a positive direction, driving the clamping diode 53 into non-conduction and supplying a more positive voltage to the anode electrodes of the diodes 31, 32 included in the second diode quad 25. The forward bias across the second diode quad 25 is increased, causing the four diodes 30, 31, 32, 33 included in the second diode quad 25 to conduct. The level of the trapezoid wave is made large with respect to the level of the signal occurring during the interval 70 also applied to the second diode quad 25, causing the diodes 30, 31, 32, 33 in the second diode quad 25 to be fully conducting. The diode quad 25 conducts at a constant current level determined by the level of the trapezoid wave, waveform C, and appears as a low impedance path during the signal interval 70. The signal received during interval 70 and over lead 34 is fed through the second diode quad 25 with little, if any, attenuation, and is applied from the junction of the diodes 32 and 33 in the second diode quad 25 to the output terminal 58. Thus, the second diode quad 25 is operated to pass the signal during interval 70 at the output of the first automatic phase compensation circuit 19 to the output terminal 58, while the first diode quad 24 is operated to block any signal received from the second automatic phase compensation circuit 20.

The signal during the next signal interval 71, shown in the next line B of FIG. 2, is reproduced by the head No. 2 on the wheel 11 and appears at the output of the second automatic phase compensation circuit 20. The signal during signal interval 71 is fed from the second automatic phase compensation circuit 20 over lead 35 to the cathode electrode of the diode 26 included in the first diode quad 24 and to the anode electrode of the diode 27 also included in the first diode quad 24. The signal interval 71 is shown as beginning before the previous signal interval 70 ends. The two signal intervals overlap one another for the time period $t_1+t_2$ during which the same message content occurs in both signal intervals 70, 71. By way of example, the time period $t_1+t_2$ is assumed to be approximately 70 microseconds. For the period $t_1$ equal to approximately the first 20 microseconds of the overlap, for example, the trapezoid wave, waveform C, is timed so that no change in the level thereof takes place. The operation of the two diode quads 24, 25 remains as described above. The second automatic phase compensation circuit 20 operates during the period $t_1$ to adjust the phase of the signal interval 71 according to the standard provided by the reference generator 23.

Following the period $t_1$, the trapezoid wave producer by the generator 36 is timed so that it shifts at a gradual and constant rate during the period $t_2$ from the positive-going level to a negative-going level. The period $t_2$ is, in the example given, of approximately 50 microseconds duration. The change in the level of the received trapezoid wave results in a corresponding change in the current conducting level of the transistor 38. The collector electrode voltage of the transistor 38 becomes positive-going and the emitter electrode voltage becomes negative-going, the change in the collector and emitter voltages following directly the change in the level of the trapezoid wave received by the transistor 38. The capacitor 42 charges in a positive-going direction until the cathode electrodes of the diodes 30, 33 in the second diode quad 25 are clamped to ground by the action of the diode 44. The capacitor 51 charges in a negative-going direction until the anode electrodes of the diodes 31, 32 included in the second diode quad 25 are clamped by the action of the diode 53 to the bias potential supplied by the transistor 54.

The second diode quad 25 is operated at the same rate of change as occurs in the level of the trapezoid wave from a condition of full, constant current conduction to a condition of zero current conduction. The second diode quad 25 is operated over the period $t_2$ to gradually reduce the amplitude of the signal during interval 70 appearing at the output terminal 58 from its normal constant level at the beginning of the period $t_2$ to zero at the end of the period $t_2$. The amplitude of the signal during interval 70 as applied to the output terminal 58 is diminished to zero at the rate determined by the timing of the trapezoid wave. The second diode quad 25 thereafter blocks any signal received from the first automatic phase compensation circuit 19.

Simultaneously with the above operation during the period $t_2$, the capacitor 45 charges in a positive-going direction. The diode 47 is held non-conducting, and a gradually increasing positive-going voltage is applied to the anode electrodes of the diodes 26, 29 included in the first diode quad 24. The capacitor 48 is charged in a negative-going direction. The diode 50 is held non-conducting, and a gradually increasing negative-going voltage is applied to the cathode electrodes of the diodes 27, 28 included in the first diode quad 24. The first diode quad 24 switches from a condition of no current conduction at the beginning of the period $t_2$ to a condition of full, constant current conduction at the end of the period $t_2$. The rate of switching follows directly the change in the level of the trapezoid wave. The signal received over lead 35 during interval 71 goes at the output terminal 58 from zero amplitude at the start of the period $t_2$ to its full, constant amplitude at the end of the period $t_2$. The first diode quad 24 thereafter presents a low impedance path over which the signal during interval 71 from lead 35 passes to the output terminal 58.

The two diode quads 24, 25 can be considered as two resistances varied in synchronism so that one resistance increases from a low value to a high value at a given rate with the other resistance simultaneously decreasing from the high value to the low value at the same rate. The signal during the interval 70 fed through the increasing resistance of the second diode quad 25 is made to fade-out, and the next signal during the interval 71 fed through the decreasing resistance of the first diode quad 24 is made to fad-in, maintaining the continuity of the single resulting signal, waveform D, appearing at the output terminal 58. Since the same message content occurs in the overlapping signals during intervals 70 and 71 during the period $t_2$, no loss of message content results from the switching action.

Applying a vector analysis to the operation of the diode quads 24 and 25, the first signal during interval 70 can be represented as a signal vector of a first phase which starts at zero amplitude and increases to a given amplitude. The second signal during interval 71 can be represented as a signal vector of a second phase which starts at the given amplitude and decreases in amplitude to zero. The phase of the resultant vector shifts gradually from that of the signal vector corresponding to the first signal during interval 70 to that of the signal vector corresponding to the second signal during interval 71. The vector rate of change of phase with time is small. Any random phase relationships introduced in the continuous signal, waveform D, due to switching between the signals during intervals 70, 71 appear as a gradual change in phase. Transients produced upon demodulation of the continuous signal due to the presence of the random phase relationships are reduced or minimized.

The operation continues in the manner described as signals during successive signal intervals are switched into the continuous signal produced at the output terminal 58. During the period of overlap between the signal interval 71 and the next signal interval 72, the trapezoid wave, waveform C, again becomes positive-going. The first diode quad 25 becomes conducting. The gradual change in the states of the two diode quads 24, 25 following the rate of change in the level of the trapezoid wave, waveform C, results in the fade-in of the signal from head No. 3 during interval 72 at the output terminal 58 and the simultaneous fade-out of the signal from head No. 2 during interval 71 at the output terminal 58. The second diode quad 25 is switched into a constant current conducting condition, and passes the signal from head No. 3 during interval 72 from the automatic phase compensation circuit 19 to the output terminal 58.

Upon the appearance of the following signal during interval 73, the trapezoid wave, waveform C, again becomes negative-going. The diode quads 24, 25 are operated to fade-out the signal from head No. 3 during interval 72 and to fade-in the signal from head No. 4 during interval 73 at the output terminal 58. During the next signal interval 74, a signal is reproduced by the head No. 1 on the wheel 11, the head wheel 11 beginning a new cycle of rotation at this time. As before, the diode quads 24, 25 are operated to fade-out the signal from head No. 4 during interval 73 and to fade-in the signal from head No. 1 during interval 74. The operation upon further signals being reproduced in turn by the heads on the wheel 11 continues in the manner described.

The individual frequency modulated signal segments or intervals appearing at the outputs of the automatic phase compensation circuits 19, 20 are combined into a single, continuous, frequency modulated signal at the output terminal 58. The continuous output signal will have a constant amplitude corresponding to that of the signal intervals. The two diode quads 24, 25 operate, in effect, as linear amplitude modulators in response to the trapezoid wave to fade from one signal interval to the next. Because of the balanced, four diode configuration of the two diode quads 24 and 25, none of the trapezoid or control input is coupled through the diode quads 24, 25 to the output terminal 58. The balanced arrangement of diodes in each of the diode quads 24, 25 serves to isolate the output of the diode quads 24, 25 from all but the signal intervals received from the automatic phase compensation circuits 19, 20. The continuous signal appearing at the output terminal 58 can be applied to any desired utilization circuit. Such utilization circuits can include suitable demodulating means or further means for performing a desired processing of the signal. Since any random phase relationships introduced in the continuous signal appear at most as a gradual rather than an abrupt change in phase, transients or other distortion which might tend to be introduced in the signal upon further processing due to the presence of the random phase relationships are reduced or minimized.

The manner in which the transistor 54 and associated components operate to provide a bias to the diode quads 24, 25 has been described. While a positive bias resulting in the application of a forward bias to the diode quads 24, 25 has been mentioned, a negative bias resulting in the application of a reverse bias to the diode quads 24, 25 can be used in the embodiment of FIG. 1 as well. In either case, the level of the bias is determined as a function of the level of the trapezoid wave and the current conducting characteristics of the diodes used in the diode quads 24, 25. The bias level is determined by the setting of the variable resistance 57 so that the two diode quads 24, 25 are conducting substantially equal current when the trapezoid wave completes one-half of its transition from one of its levels to the other. In other words, the current contributed by one diode quad to the total output current has decreased and the current contributed by the other diode quad to the total output current has increased an equal and opposite amount until the crossover point is reached at which the current contributed by each of the two diode quads is the same, the crossover point coinciding in time with the mid-point in the transition of the trapezoid wave between its negative-going and positive-going levels.

In this condition, the continuous output signal at the output terminal 58 exhibits a constant amplitude before, during and after the switching between signal intervals, the constant amplitude of the continuous signal corresponding to that of the signals during the intervals. This is true, since the current contributed by one diode quad added to that contributed by the other diode quad provides a total output current of constant amount over the period in which the trapezoid wave completes the transition between its two levels. Any change in the current contributed by one diode quad is offset by an equal and opposite change in the current contributed by the other diode quad.

When a proper bias level exists, a continuous output signal of constant amplitude results. If the bias supplied by the transistor 54 and its associated components is made more negative than this level, the diode quads 24, 25 now respond at a later time to a transition in the received trapezoid wave. The total output current contributed by the two diode quads 24, 25 is less than that necessary to maintain the amplitude of the continuous output signal constant during the switching, and a dip in the amplitude of the continuous output signal occurs. If the bias is made more positive than the above-mentioned proper level, the diode quads 24, 25 respond at an earlier time to a transition in the received trapezoid wave. The total current contributed by the two quads 24, 25 is more than that necessary to maintain the amplitude of the continuous output signal constant during the switching. In this case, a hump occurs in the amplitude of the continuous output signal. The proper bias level and polarity can be determined by monitoring the continuous output signal at the output terminal 58 and adjusting the setting of the variable resistor 57 until the desired waveshape is obtained. While the provision of a bias which provides a constant amplitude, continuous output signal is indicated as preferred, it may be found that the setting of the bias so as to produce either dips or humps in the amplitude of the continuous output signal is advantageous in the further processing of the continuous signal according to the requirements of a particular application.

By way of example, the diodes 26 through 33, 44, 47, 50, 53 shown in the embodiment of FIG. 1 can be of the type identified as 1N903 silicon junction diodes. The two transistors 54 and 38 can be of the type identified as 2N2270.

What is claimed is:

A switching system for producing a continuous, frequency modulated signal of constant amplitude from overlapping, frequency modulated signal segments comprising in combination, (a) a bridge circuit including first, second, third and fourth diodes, the cathode of said first diode being connected to the anode of said second diode, the cathode of said third diode being connected to the anode of said fourth diode, the anodes of said first and third diodes being connected together, and the cathodes of said second and fourth diodes being connected together, (b) a second bridge circuit including fifth, sixth, seventh and eighth diodes, the anode of said fifth diode being connected to the cathode of said sixth diode, the anode of said seventh diode being connected to the cathode of said eighth diode, the anodes of said sixth and eighth diodes being connected together, and the cathodes of the fifth and seventh diodes being connected together, (c) a first signal input means connected to apply a first signal to the junction of said first and second diodes in said first bridge circuit, (d) a second signal input means connected to apply a second signal to the junction of said fifth and sixth diodes in said second bridge circuit, (e) an output means connected to the junction of said third and fourth diodes in said first bridge circuit and to the junction of said seventh and eighth diodes in said second bridge circuit, (f) a transistor having a base, emitter and collector electrode, (g) means for applying to said transistor's collector a reference potential of a given polarity, (h) means for applying to said transistor's emitter a reference potential of a polarity opposite to said given polarity, (i) a ninth and tenth diode both having an anode and cathode, said ninth diode's anode connected to said tenth diode's anode with the junction formed thereby connected to said transistor's emitter, (j) means for coupling said ninth diode's cathode to said junction between said sixth and eighth diode's anodes, (k) means for coupling said tenth diode's cathode to said connection between said first and third diode's anodes, (l) a first control signal input means including a capacitor and an eleventh diode connected to apply a first control signal to the junction of said second and fourth diodes, (m) a second control signal input means including another capacitor and a twelfth diode connected to apply a second control signal to the junction of said fifth and seventh diodes in said second bridge circuit, (n) control means coupled to the base of said transistor to operate said transistor in a region to cause it to behave at said emitter electrode as a low impedance voltage source for determining the conduction of said diodes in said first and second bridge circuits to be less than that required to cause them to conduct, said control means further causing said transistor in combination with said capacitors and said eleventh and twelfth diodes to clamp said first and second control signal paths at a level to provide a constant amplitude output from said output means in accordance with said first and second input signals whereby any impedance differences between said first and second bridge diodes are effectively cancelled.

References Cited

UNITED STATES PATENTS 3,152,226 10/1964 Stratton __________ 179—100.2

BERNARD KONICK, *Primary Examiner.*

J. R. GOUDEAU, *Assistant Examiner.*